Jan. 15, 1929. 1,699,200
A. H. PITNEY
REGISTERING MECHANISM FOR POSTAGE METER MACHINES
Filed July 7, 1923 3 Sheets-Sheet 1

Arthur H. Pitney, Inventor:
By Alexander T. Lowell
Attorneys.

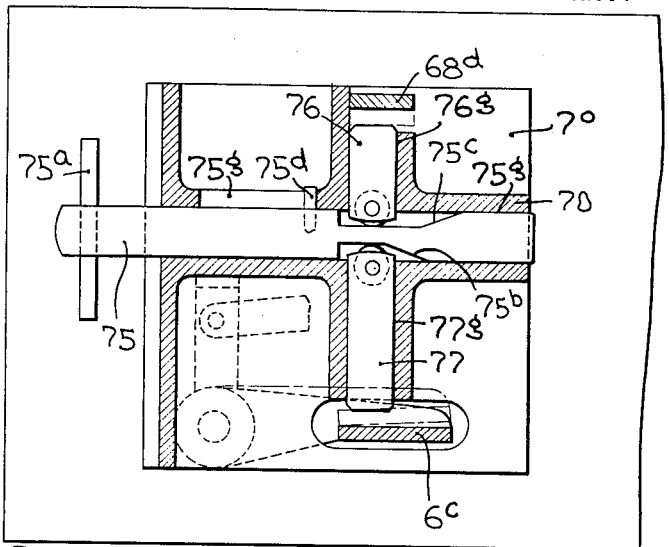
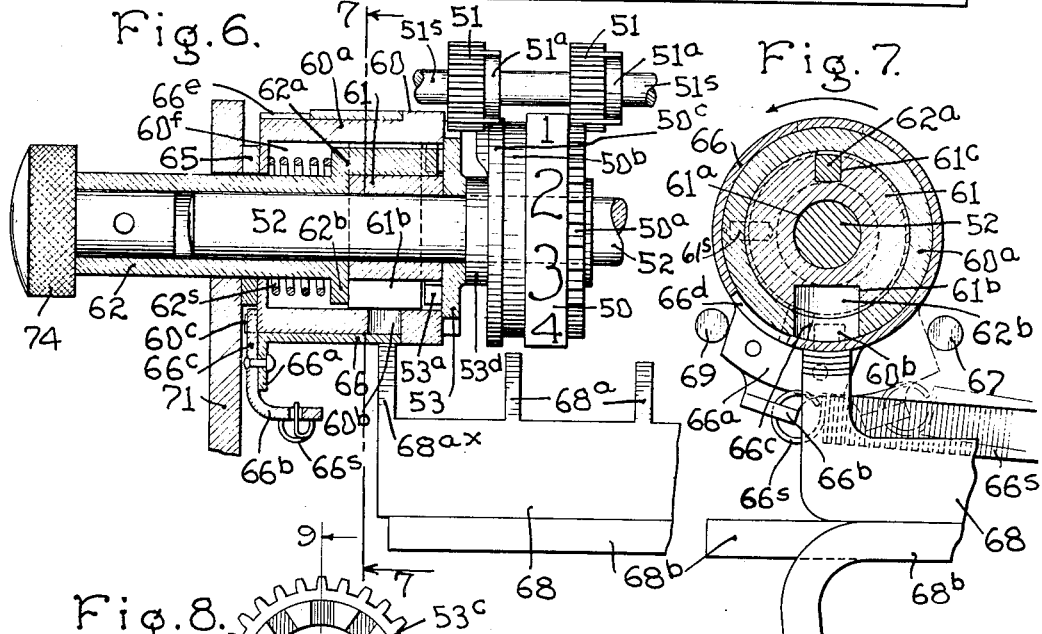
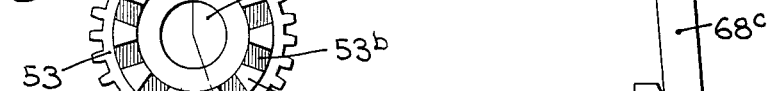

Patented Jan. 15, 1929.

1,699,200

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

REGISTERING MECHANISM FOR POSTAGE-METER MACHINES.

Application filed July 7, 1923. Serial No. 650,128.

This invention relates to recording or registering mechanisms, and is particularly designed for use in the registering mechanisms of the so-called "postage meter" machines of the type shown in my Patents #1,273,793 dated July 23, 1918, Reissue #14,916 dated July 13, 1920 and #1,370,668 dated March 8, 1921.

Such machines are designed for use by persons, firms, or corporations having a large number of letters or packages to mail, and enables them to buy any desired amount of prepaid postage from the Government, and thereafter print such amount of postage, from time to time, upon their mail matter until the total amount of postage which they purchased is exhausted; whereupon the machine will become automatically locked so that no further stamps can be printed thereby.

The present invention in particular is an improvement on the registering mechanism shown in my application for patent for postage meters, filed July 12, 1922, Serial No. 574,427, and my application for patent for meter for postage meters filed Dec. 19, 1922, Serial No. 606,427 such applications disclosing registers adapted to either register the exact number of impressions of a die of fixed denomination, or to register the amount in dollars and cents of that type of postage meter machine which prints stamps of same or different denominations. The construction of the register is essentially the same in either case, the difference being that in one case the register will lock when the full number of impressions has been made, and the numerals at the sight opening will show an abstract number representing the number of impressions used; and in the other case the numerals at the sight opening will indicate dollars and cents, and the meter will lock when the whole number of dollars is exhausted; and may leave an unused balance in cents, which unused fraction of a dollar will be added to the amount purchased at the next setting of the meter, and not lost.

The object of the present invention is to provide means to facilitate the "resetting" or "charging" of the registering mechanism: and to enable the register or meter to be reset if desired for a less amount than the total capacity of the register.

In my aforesaid application Serial No. 574,427 means were provided for resetting a meter equipped with this type of counter, in each of these cases the "resetting" or "charging" was restricted to the total capacity of the "balance" or "subtracting" counter. One object of the present invention is to provide for greater flexibility in "charging" or "resetting" the meter by providing means whereby the highest denomination numeral wheel of the counter can be shifted with relation to its driving gear. To illustrate, in my said application Serial No. 574,427 a register having four numeral wheels could only be "charged" for 10,000; while with my improvement, such a register can be "charged" for 1000; 2000; 3000 etc., up to 10,000 in multiples of 1000.

This flexibility is desirable, because while it is good policy to have a meter of large capacity, it is not always convenient, on account of the amount of money involved for the owner to have it "charged" for the full amount. The present invention also has particular reference to what are known as geared counters, in which each numeral wheel of the series is driven by means of intermittent gears by the wheel of next lower denomination, down to the units wheel, which is the prime mover of the series. All the wheels are positively controlled by the unit wheel and the gearing precludes the possibility of any numeral wheel being misplaced by accident or otherwise. For such reasons the "geared" type of register excels the "ratchet type" of register for use in postage meters, and the present invention while giving a greater latitude in "charging" in no way affects the excellence of this geared type of register.

Another object of this invention is to provide a simpler method of restoring the "locking comb" and lock tripping levers to normal position in recharging the meter. For this purpose I have provided means whereby the controls are easily accessible, and so placed that the doors of the meter cannot be closed if such parts are inadvertently left in improper positions after a "resetting" or "charging" operation.

Other objects and advantages of the invention will be hereinafter set forth.

I will explain the invention with reference to the accompanying drawings which illustrate one practical embodiment of the invention, which, however, is capable of various changes in form, construction and combinations of parts within the scope of the invention. And it will be understood that the invention is adaptable to other meters or registering mechanisms in which are employed numeral wheels of the geared type. In claims I have set forth the essentials of the invention and the novel features of construction and novel combinations of parts for which protection is desired.

In said drawings:

Fig. 5 is a detail horizontal section on the line 5—5 Fig. 2.

Fig. 6 is an enlarged detail sectional view of the numeral wheel of highest denomination and the devices for setting same.

Fig. 7 is a transverse section on the line 7—7 Fig. 6.

Fig. 8 is a detail face view of the setting wheel 53.

Fig. 9 is a sectional view of said wheel on line 9—9 Fig. 8.

Figure 1:
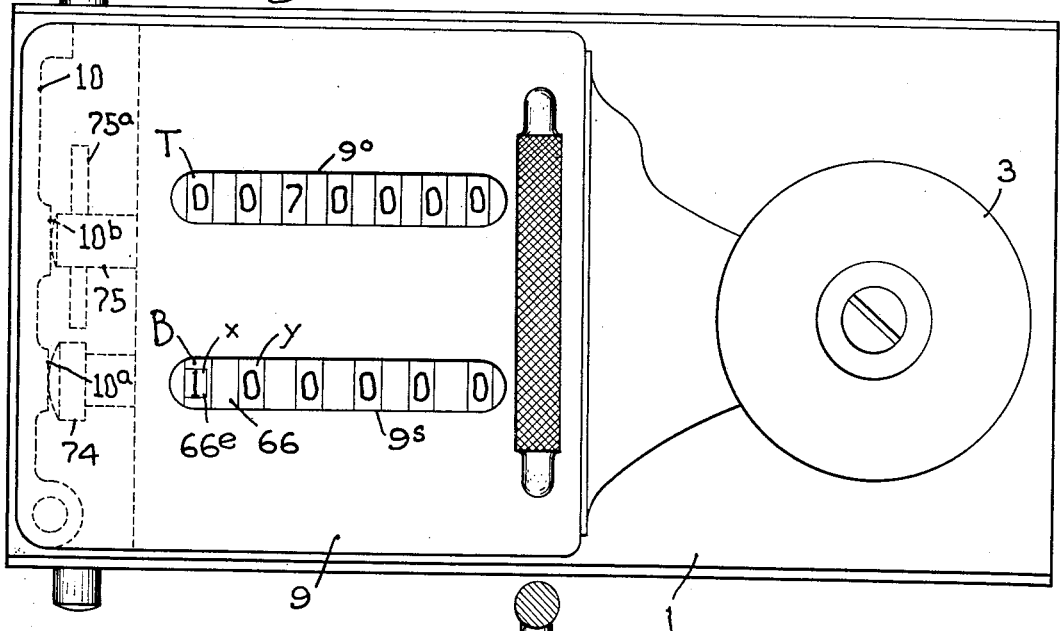
Fig. 1 is a top plan view of a meter equipped with my improvements.

The meter consists of a base casting 1 (Figs. 1 and 2) provided with a printing die 2, and an idle roller 3 and a counting or registering mechanism enclosed in a case 9. The registering mechanism preferably includes two registers of the geared type. One of these registers indicated at T, Fig. 1 is called the "total" register, as it adds one unit to its count for every effective operation of the machine. This total counter is never reset or "charged" and runs on indefinitely recording the total output of the meter and automatically clears to zero after registering ten million. The other register indicated at B, Fig. 1, is called the "balance" register, and is arranged to subtract one unit for each effective operation of the machine from the number for which it was "set" or "charged"; and such balance register is automatically locked or rendered inoperative, when it reaches "zero".

Suitable means are provided for operating the registering mechanisms from the die in accordance with the effective operations thereof, this means being preferably such as shown and described in my aforesaid patents and applications, and therefore it is unecessary to illustrate and describe same in detail herein.

The two registering mechanisms may be arranged and their unit wheels operated substantially as shown and described in my application filed December 12, 1922, Serial No. 606,427, above referred to (with the exception that the third or "set back" may be omitted.). In drawings I have shown only one of the registering mechanisms in detail as both are practically constructed alike except that the balance register (which is shown in detail) need not have as many numeral wheels as the total register and the total register need not be provided with means for adjusting or setting the numeral wheel of highest denomination such as is provided in the balance register, as it is not necessary or desirable to reset the total register at any time.

Figure 2:
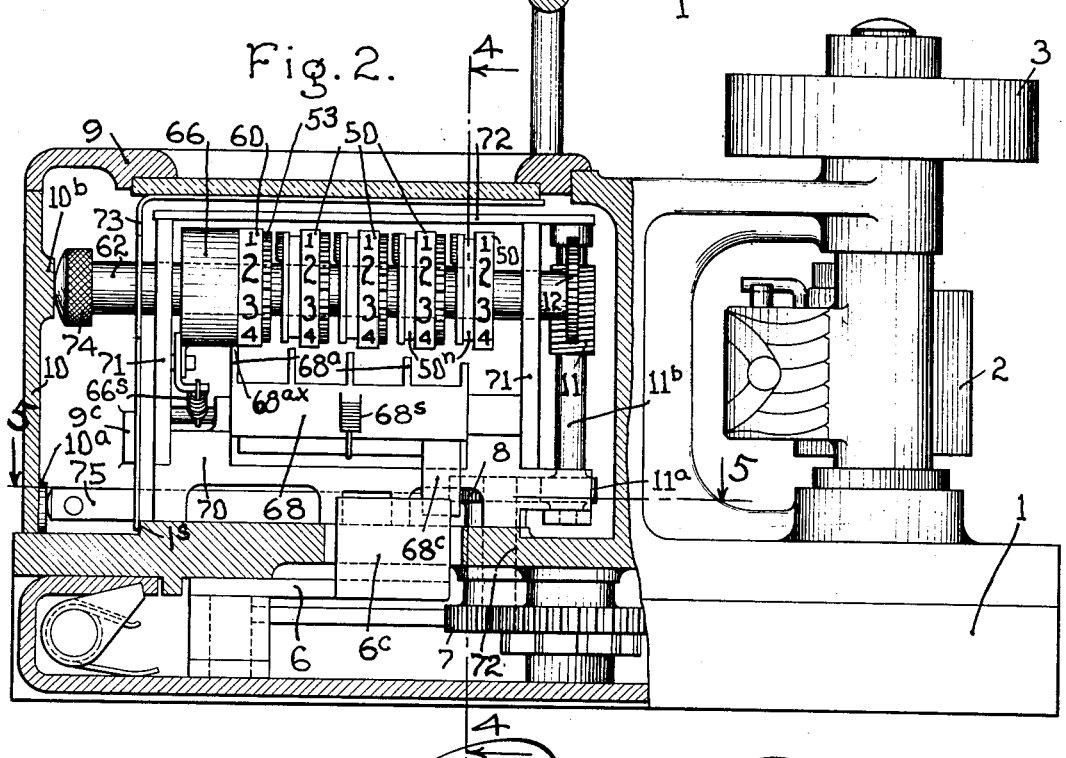
Fig. 2 is a side view of the meter with part of the casing broken away to show the interior mechanisms in elevation.

The total and balance counters are mounted in a frame comprising a base plate 70 and two side plates 71 (Fig. 2). The balance counter B comprises a series of similar numeral wheels 50 and a numeral wheel 60 of the highest denomination. The wheel 60 is located at the end of the series opposite the units wheel. These numeral wheels are all mounted upon a shaft 52 and the units wheel is fastened to shaft 52 and the other numeral wheels are all loosely and rotatably mounted thereupon, but are not movable longitudinally thereof.

Each of the numeral wheels 50 is provided with a notched disk 50$^b$ and a one-toothed gear 50$^c$, and each of the numeral wheels, 50, except the units wheel, is provided with a spur gear 50$^a$ (see Figs. 2 and 6). In the geared type of register each gear 50$^c$ meshes with a carryover pinion 51 loosely mounted on a shaft 51$^s$, parallel with the shaft 52, and the pinion 51 is provided with a dwell gear 51$^a$ which is adapted to mesh with the one-toothed gear 50$^c$ of the adjacent numeral wheel of lower denomination and for each revolution of a numeral wheel of lower denomination the next numeral wheel of higher denomination will be shifted one point. These parts are constructed and operated preferably as fully described in my application Serial No. 574,427, and therefore need not be further described or illustrated in detail herein, as the particular construction of the geared numeral wheels in the register (except that of highest denomination) is not a part of the present invention.

Each numeral wheel of lower denomination transmits motion to the driving gear of the numeral wheel of the next highest denomination through the gearing at proper times, the ratio being 10 to 1. One full revolution of any numeral wheel in the series will move the numeral wheel of next highest denomination one tenth of a revolution. This progressive transmission of motion continues through the set of numeral wheels 50 and the last numeral wheel 50 imparts similar movement to a specially constructed gear 53 (Figs. 2 and 6) rotatably mounted on shaft 52 between the wheel 60 and adjacent wheel 50.

The gear 53 is not directly fastened to the numeral wheel 60, but can be made to drive it by novel adjustable connections as if it were so fastened.

The object of such adjustable connection is to enable the wheel 60 to be set independently of the numeral wheel 50 so that any one of the ten figures on wheel 60 will be visible at the sight opening of the case. In other words this enables the register to be "charged" or reset, as hereinafter explained, for any amount from 1000 to 10,000 in multiples of 1000 on a four wheel counter, and in multiples of 10,000 on a five wheel counter at any time, without waiting to exhaust the full amount.

In the drawings the shaft 52 of the balance register carries a spur gear 12 which meshes with a worm 11 on a vertical shaft $11^b$ journaled in the top plate 72 of base 70. As shown, pinion $11^a$ on the shaft $11^b$ meshes with a pinion 8 on the upper end of a stub shaft 72 which is journaled on the base 1 and on which the base of frame 70 is supported, and has on its lower end a gear 7 which is one of a train of gears not shown, directly driven from the shaft of the die 2. This gearing may be substantially such as explained in my application Serial #606,427, aforesaid, and needs no special description herein. The ratio of the gearing is such that one revolution of the die will cause the unit wheel of each of the counters B and T to make one tenth of a revolution and alter the count by 1 unit.

The total register T may be also similarly geared to and operated from the shaft $11^b$ so that for each rotation of the die in the meter shown the units wheel and both the total register and the subtracting or balance register B will be operated one unit.

The subtracting or balance counter B as illustrated in Fig. 2, has five figure wheels and therefore a capacity of 100,000 but it may also be built up to a smaller or greater capacity by diminishing or increasing the number of figure wheels, the number in the illustration being chosen at random to aid in the description.

The register re-setting means.

To enable the numeral wheel 60 to be adjusted to set or charge the meter for any desired multiple without using the full amount, (as hereinafter mentioned) the numeral wheel 60 is disconnectably connected with the gear 53 which operates it. The gear 53, Figs. 6, 8, 9, is directly operated as described from the numeral wheel 50 of highest denomination in the same manner and by the same means that one numeral wheel 50 carries over to the next numeral wheel 60.

As shown in Figs. 2, 6, 7, the numeral wheel 60 is preferably formed on or is part of a cylinder $60^a$, which is mounted on a member 61 rotatably fitted on the shaft 52, Fig. 6 and which can be secured to the cylinder by screws $61^s$. This member 61 is shorter than the cylinder $60^a$ and rotatably supports the cylinder $60^a$ on shaft 52. The flanged rim or wheel 60 is engraved with 10 figures similar to those of the other numeral wheels 70 on the cylinder $60^a$.

In the member 61 is a longitudinal slot $61^c$ which is adapted to be engaged by a finger or pin $62^a$ attached to the inner end of a sleeve 62 which surrounds the outer end of shaft 52 and extends through the frame member 71 and supports the shaft thereon; and the outer end of the sleeve may be provided with a knob 74 by which it may be easily manipulated. The sleeve 62 is normally pressed inwardly by means of a spring $62^s$ interposed between a flange $61^b$ on the outer end of cylinder $61^a$ and a flange $62^b$ on the inner end of the sleeve 62, from which flange finger $62^a$ projects. When the sleeve 62 is in its innermost position (Fig. 6), the inner end of the finger $62^a$ projects beyond the inner face of the member 61 and is adapted to engage a notch $53^b$ in a flange $53^a$ on the face of the gear 53. This flange $53^a$ projects into the inner end of cylinder $60^a$ and is enclosed thereby so that the body of the wheel 53 may lie close to the wheel 60.

By drawing sleeve 62 outward finger $62^a$ can be disengaged from the wheel 53, and by then turning the sleeve the cylinder $60^a$ and wheel 60 can be turned relative to the gear 53 which is prevented from turning by its operating pinion 51: thus any desired numeral on wheel 60 can be brought opposite the sight opening, and thus indicate how many more ten thousands (in a 5 wheel counter or thousands in a 4 wheel counter) are available. Upon releasing sleeve 62 spring $62^s$ will move the sleeve inward and cause finger $62^a$ to engage a notch in the flange $53^a$, and again lock the numeral wheel 60 to the gear 53, so that the said wheel 60 will be operated properly by gear 53 from the adjacent numeral wheel 50.

The numeral wheel resetting devices.

Means are provided, such as described in my aforesaid applications and patents, whereby the balance register is locked when all the numeral wheels therein reach "0". Such locking means comprises a locking plate comb 68 provided with a series of fingers $68^a$, one for each of the numeral wheels on the counter, such fingers being of unequal length, and are respectively adapted to enter a notch or slot in the notched disk $50^b$ of the related numeral wheel 50, when such numeral wheel registers "0". The fingers $68^a$ are successively greater in length from that engaging the units numeral to that engaging the numeral wheel of highest denomination, and the plate is pressed toward the numeral wheels by suitable springs. When the numeral wheel of highest denomination reaches "0" the first finger on the locking plate would engage the notch of such wheel and prevent further rotation thereof; and the numeral wheel of next lower denomination will be locked when it reaches "0", and so on down until the units wheel reaches "0", whereupon all the numeral wheels will be locked, and the plate then moving to the limit of its movement, effects the release of the other locking mechanisms, such as described in my aforesaid patents and applications. The construction and operation of the locking comb and locking mechanisms have been fully described in various applications and patents, and it is not necessary to repeat same here in detail.

In the construction shown, the wheel 60 does not have any slotted disk for engagement of the longest tooth $68^{ax}$ of the locking plate, but the cylinder $60^a$ has a radial slot $60^b$, (Figs. 6 and 7) which is adapted to be engaged by the longest tooth $68^{ax}$ of the locking comb. This slot $60^b$ is so located that it will register with the tooth $68^{ax}$ when the wheel 60 reaches "0" position; that is when the "0" engraved on the wheel 60 registers with the sight opening $9^s$ in the casing 9. The tooth $68^{ax}$ will then be in position to enter the slot $60^b$ when wheel 60 reads "0" at the opening, no matter what the position of the wheel 60 relative to gear 53 may be. The member 61 may also have a slot $61^b$ adapted to register with the slot $60^b$ to permit the full entry of the tooth of the locking comb.

When the hole $60^b$ is in line with the "0" engraved on wheel 60 it would ordinarily be impossible to charge or set the register at 100,000 because in charging at this number the zero of the 5th wheel or cylinder $60^a$ would be displayed at the sight opening and the slot $60^b$ register with the tooth $68^{ax}$ of the locking comb, and the tooth $68^{ax}$ would enter the slot $60^b$. To prevent tooth $68^{ax}$ entering slot $60^b$ at such times a shell 66 is mounted on the cylinder $60^a$ beside the wheel 60, and has a loose fit on cylinder $60^a$ so as not to interfere with the rotation thereof (see Figs. 6 and 7).

Shell 66 is allowed only a limited rotatorial movement relative to the shaft 52 and, in the construction shown, has a lug $66^a$ on one end to which is attached a finger $66^b$, whose lower end is bent inwardly under the cylinder and beneath the shell, (Figs. 6 and 7) and is connected to one end of a spring $66^s$, the other end of which spring is fastened to a fixed member of the frame (see Fig. 2). This spring tends to normally turn the shell in the direction of the arrow, (Fig. 7), this rotatorial movement of the shell in a counter clockwise direction being limited by the lug $66^a$ striking a stop 67, Fig. 7; the movement of the shell in the opposite direction is limited by a stop 69.

A lug $66^c$ on the outer end of the shell is adapted to be engaged by a lug $60^c$ projecting from the end of the cylinder $60^a$, when the cylinder $60^a$ is revolved clockwise to the position shown in Fig. 7, and thereby causes the shell to turn with it to the position shown in Fig. 7. A washer 65 placed between the side frame 71 and cylinder $60^a$ insures sufficient clearance for the movements of lugs $60^c$ and $66^c$.

In the shell 66 is a slot $66^d$ which will register with the comb tooth $68^{ax}$ whenever the shell 66 is in normal position, (that is when its flange $66^a$ engages the stop 67,) but when the shell is moved so that its flange $66^a$ engages the stop 69, the opening $66^d$ will be moved out of line, and the comb tooth $68^{ax}$ will contact with the shell 66 and be prevented from entering the slot $60^b$ in the cylinder $60^a$.

The direction of rotation of the wheel 60 when the register is in operation is indicated by the arrow in Fig. 7.

Fig. 1 of the drawing shows the amount appearing at the sight opening when the balance counter is set or (at $y$) charged to the limit of its capacity, or, 100,000. The "0" of the numeral wheel 60 is shown on the dial Fig. 1 and consequently the slot $60^b$ in $60^a$ is in line with the comb tooth $68^{ax}$ which would enter were it not for the interposition of the shell 66, which is then forced to take the position indicated in Fig. 7 by the lug $60^c$ on cylinder $60^a$ engaging lug $66^c$ on shell 66.

When the register starts to operate, the cylinder $60^a$ will be moved one tenth of a revolution in the direction of the arrow (Fig. 7) and shell 66 will be moved with it by the action of spring $66^s$. The slot $66^d$ will then come opposite comb tooth $68^{ax}$ allowing it to engage the surface of the cylinder $60^a$, but slot $60^b$ will then have been moved out of register with a tooth $68^{ax}$. Cylinder $60^a$ can be turned at intervals one tenth of a revolution until zero ("0") on wheel 60 appears at the sight opening, and its slot $60^b$ again comes in line with comb tooth $68^{ax}$ at which time tooth $68^{ax}$ will enter the slot because the opening $66^d$ in shell 66 is then in register with the slot $60^b$ the lug $66^c$ of the shell 66 being then on the opposite side of lug $60^c$. The numeral wheel 60 is then locked until the register is reset or recharged.

In charging the register the cylinder $60^a$ is revolved manually by means of the knob 74, in a direction opposite to the arrow Fig. 7. This moves lug $60^c$ away from lug $66^c$ and if cylinder 60 is turned a full turn or in other words if the register is again reset or "charged" for the full 100,000 lug $60^c$ will again engage lug $66^c$ on the opposite side and move it to the position shown in full lines Fig. 7. Cylinder $60^a$ cannot be turned clockwise further than this, as the flange $66^a$ then engages the stop 69 and prevents further movement.

Shell 66 is also preferably provided with an opening or notch $66^e$, Fig. 1 on its upper side and adjacent to the frame 71. Which opening is so located that it will be seen at the dial whenever the shell is in the position shown in Fig. 7, or when the meter is charged for 100,000. At all other times opening 66ᵉ is out of line with the dial opening. The object of opening 66ᵉ is to expose to view a part of the surface of the cylinder 60ª, whereon a figure "1" is engraved (as indicated at x— see Fig. 1). This figure 1 is directly in line with the zero in the numeral wheel 60, and when said figure 1 is exposed to view it makes the register read 100,000 (instead of 00000), see Fig. 1. This numeral 1 is only exposed when the meter is charged or set for 100,000: and shows that the meter is properly fully charged; and if such numeral 1 were not there, the register would read (00000) five ciphers when the charge is 100,000.

A numeral wheel of highest denomination provided with an auxiliary numeral 1, and means whereby this numeral may be exposed at the setting of the register, and covered or obscured at the initial operation of the register, is disclosed and claimed in my companion application filed July 10, 1923, Serial No. 650,701.

The action of the locking comb has been described in my aforesaid patent and applications, and in the present invention I have made various improvements, effecting the operation and manipulation of the locking comb, as follows:

The locking comb 68 is pivoted at 68ᵉ beneath the registering mechanisms B and T, (Figs. 2 and 4), the teeth 68ª being in position to engage the notches of the numeral wheels of the balance register under pressure of the spring 68ˢ. When the notches in all the numeral wheels 50 and notches 66ᵇ and 60ᵇ in the sleeve 66 and shell 60ª are in alignment with tooth 68ªˣ (that is when all the numeral wheels have returned to "0") the locking plate 68 is moved into the position shown in dotted lines in Fig. 4, and the total register cannot be further operated until the machine is reset.

As shown, a plate 68ᵇ is attached to the bottom of locking comb 68 and a spring 68ˢ is attached to one end of the plate 68ᵇ opposite the pivot 68ᵉ. An adjacent part of plate 68ᵇ is turned downwardly to form a catch member 68ᶜ which is adapted to engage a catch member 6ᶜ on the upturned end of a lever 6 which controls the locking levers in the base of the meter. The opposite end of plate 68ᵇ has a downwardly projecting lug 68ᵈ adapted to be engaged by a push bar 76 to return and hold the locking comb in its normal position while charging or resetting the register B.

The lever 6 practically corresponds in function to the lever 53 described in my application, Serial #606,427, aforesaid and the machine in which the register is used is preferably provided with automatic devices whereby when the comb 68 is shifted to position to lock the numeral wheels of the balance register further operations of the machine are prevented. These devices, however, are fully described and claimed in my aforesaid patents and applications and it is unnecessary to describe same herein; all the parts will become locked and no further effective operations can be made when the locking comb engages all the register wheels; and remains locked until said comb is disengaged from the numeral wheels of the balance register and reset in the position indicated in full lines in Figs. 2 and 4.

Figure 4:
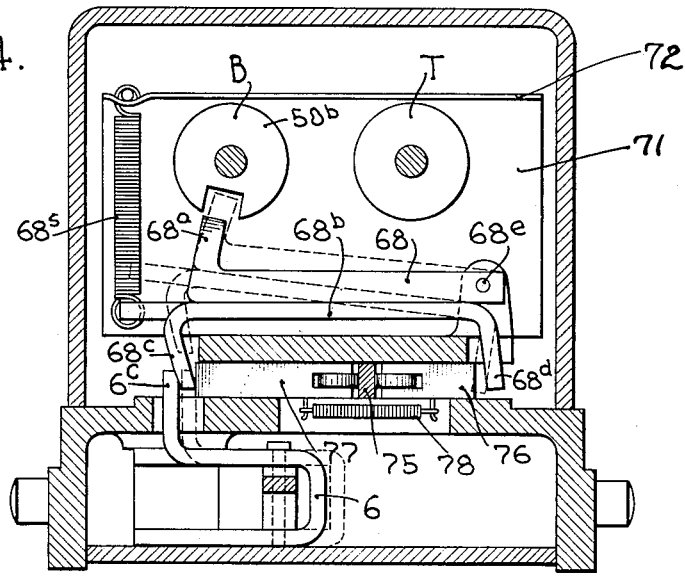
Fig. 4 is a detail section on the line 4—4 Fig. 2.

When in operation the counter reaches zero and the comb 68 rises to the dotted line position, Fig. 4. The catch member 68ᶜ in rising releases the lock trip lever 6, which under spring pressure moves to the position indicated by the dotted lines, Figs. 4 and 5. This movement of trip lever 6 renders the meter inoperative by obstructing the movement of the gears and by closing the meter pin hole with the shutter lever as explained in my aforesaid patents and applications.

In order to recharge the meter it is necessary to restore both the trip lever 6 and the comb 68 to their original positions shown in full lines in Figs. 4 and 5. This is accomplished by the following means:

As shown in Figs. 2, 4, and 5, the catch member 68ᶜ projects into the path of a push bar 77, and the lug 68ᵈ projects into the path of an oppositely movable push bar 76. These push bars are guided in aligned channels or guides 77ᵍ, 76ᵍ, formed in the base plate of the frame in which the registering mechanism and locking plate are mounted. The guides 76ᵍ and 77ᵍ are in alignment, and are disposed at right angles to a longitudinal guide 75ᵍ in which is mounted a slide bar 75 (see Fig. 5.) Bar 75 lies at right angles to push bars 76 and 77 and intermediate the adjacent ends of said bars. Bar 75 is provided with recesses adjacent the inner ends of the push bars 76 and 77, these recesses having cams 75ᵇ and 75ᶜ which are so disposed that when the bar 75 is pulled out these cams force bars 76 and 77 outwardly. When bar 75 is pushed in the push bars 76 and 77 are moved inwardly by the action of a spring 78, (Fig. 4), which is connected to the opposite bars 76 and 77 and normally tends to draw them toward each other and hold their inner ends in contact with the bar 75. When the push bars 76 and 77 are moved outward they respectively engage catch member 6ᶜ on trip lever 6 and the lug 68ᵈ on the comb 68, and will force said parts from the positions shown in dotted lines in Fig. 4 to the positions shown in full lines therein. Pushing lug 68ᵈ outward moves the comb 68 downward, but as this cannot be done until the trip lever 6 is moved out from under the catch 68ᶜ of the comb 68, the cam 75ᵇ which moves the trip lever 6 is made to engage the cross bar 77, and carry it to its farthest out position before the cam 75ᶜ engages bar 76. This insures a clear path for the catch 68ᶜ in its downward course. A pin 75ᵈ on the side of bar 75 moving in a slot 75ᵍ limits the travel of bar 75 in both directions.

After the register has been properly reset the door 10 is closed. This door is provided with bosses 10ᵃ and 10ᵇ, (Figs. 1 and 2), on its inner side, which bosses are so located that they will respectively engage the head 74 and the outer end of bar 75, and would prevent the door being closed if either bar 75 or head 74 were not properly returned to their places after the register B had been reset or "charged".

Figure 3:
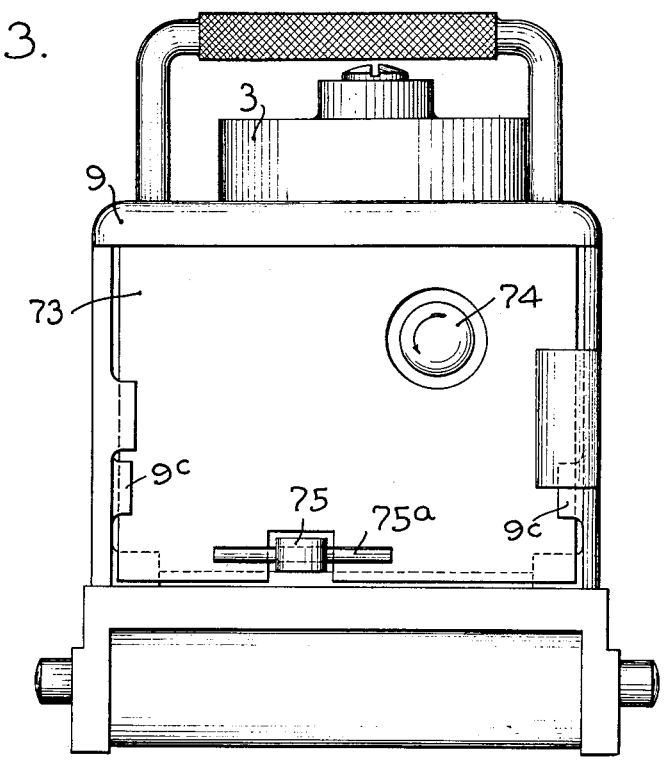
Fig. 3 is a front end view of such meter.

A sheet metal guard plate 73, (Figs. 2 and 3) is fastened to the inside top wall of the case 9 for the purpose of holding in place the glasses covering the sight openings. This plate is bent downward opposite the outer end of the registers (Fig. 2) and completely hides them. This plate is provided with slots in its top opposite the sight openings, and in its front side has an aperture for the passage of knob 74, and a recess for the passage of bar 75, (Fig. 3). A shoulder 1ˢ in the floor of the meter base 1 prevents the lower edge of the plate being pushed backward, and lugs 9ᶜ on the inside walls of the case 9 prevent the plate being pulled outward. This plate therefore effectually prevents access to the register and effectually prevents tampering with the numeral wheels or mechanisms.

Operation.

To charge or reset the register unlock and open door 10 and pull bar 75 out to the stop. Then pull slightly on knob 74 and turn it in the direction of arrow (Fig. 3) until the desired number appears at sight opening 9ˢ (Fig. 1). When the numeral 1 shows in the 6th place (x) Fig. 1 the knob can be turned no further; as the highest amount for which the register can be charged will then appear at sight opening 9ˢ. When the desired number appears knob 74 is released and sleeve 62 springs back in place, finger 62ᵃ re-engaging the gear 53. Then bar 75 should be pushed back as far as it will go, and the door 10 closed. This completes the resetting or charging operation.

In Fig. 1 the total register T reads 70,000 and the balance register B reading 100,000. This means that the machine has already performed 70,000 impressions, and is again charged for 100,000 more.

At the next effective operation of the die 2 the figure 1 (at x Fig. 1) will disappear, and 99,999 will appear at the sight opening 9ˢ. At any time thereafter, and before the wheels are locked by comb 68 it will be possible by manipulating the knob 74 to turn the numeral wheel 60 back to the point where the figure 1 on the cylinder 60ᵃ again appears at the opening 66ˢ; and by so doing increase the number of operations possible by multiples of 10,000 before the meter would become locked, provided the counter had five wheels, or in multiples of 1000 if the counter has only four wheels.

What I claim is:

1. In mechanism of the character specified having a set of numeral wheels, a locking comb adapted to engage the numeral wheels and lock same; a locking lever; a longitudinally movable bar; and members operated by said bar adapted to respectively disengage the comb from the numeral wheels, and to reset said locking lever.

2. In mechanism of the character specified having a set of numeral wheels and a locking comb adapted to engage the numeral wheels and lock same, a locking lever, a pair of oppositely movable push bars respectively adapted to engage the said latch lever and the said comb, and a slidable bar operatively engaging said push bars; whereby the push bars may be respectively caused to disengage the locking comb from the numeral wheels and to return the locking lever to unlocking position.

3. In mechanism of the character specified having a set of numeral wheels and a locking comb adapted to engage the numeral wheels and lock same in zero position; a locking lever and a finger on the locking comb adapted to engage the locking lever when the comb is free from the numeral wheels and hold said lever out of locking position; with a longitudinally movable bar and oppositely movable members operated by said bar adapted respectively to reset said locking lever, and to disengage the comb from the numeral wheels.

4. In mechanism of the character specified having a set of numeral wheels and a locking comb adapted to engage the numeral wheels and lock same in zero position, said locking comb having opposite fingers; a locking lever, one of said fingers being adapted to engage the locking lever when the comb is free from the numeral wheels and hold said lever out of locking position, with oppositely movable push bars respectively adapted to engage the said locking lever and one of the said fingers on the locking plate, a slidable bar, and means whereby when the bar is drawn outward the said fingers are respectively caused to disengage the locking comb from the registering wheels, and to return the locking lever to unlocking position.

5. In mechanism of the character specified having a set of numeral wheels and a locking comb adapted to engage the numeral wheels and lock same in zero position; said comb having a catch member and a lug; a locking lever adapted to be engaged by said catch member and held out of locking position when the comb is free from the numeral wheels; oppositely movable push bars respectively adapted to engage the said catch member and the said lug; and a slidable bar and means whereby when said bar is drawn outward one push bar is caused to engage said finger and disengage the locking comb from the registering wheels, and the other push bar returns the locking lever to unlocked position.

6. In mechanism of the character specified having a register locking member and a lever engaging said locking member; means for resetting the locking member and lever, comprising movable members adapted to respectively engage and reset the locking member and the lever, and means for operating the movable members.

7. In mechanism of the character specified, having a register, a locking comb, and a trip lever; oppositely movable members adapted to respectively engage and reset the locking comb and the trip lever, and a push bar for operating the said members.

In testimony that I claim the foregoing as my own I affix my signature.

ARTHUR H. PITNEY.